(No Model.)
M. W. ILES.
METHOD OF TREATING SLAG.
No. 505,551. Patented Sept. 26, 1893.
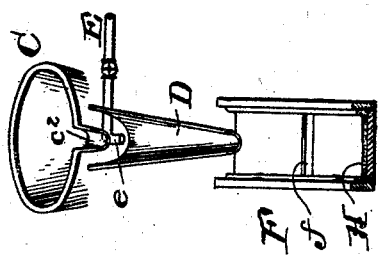
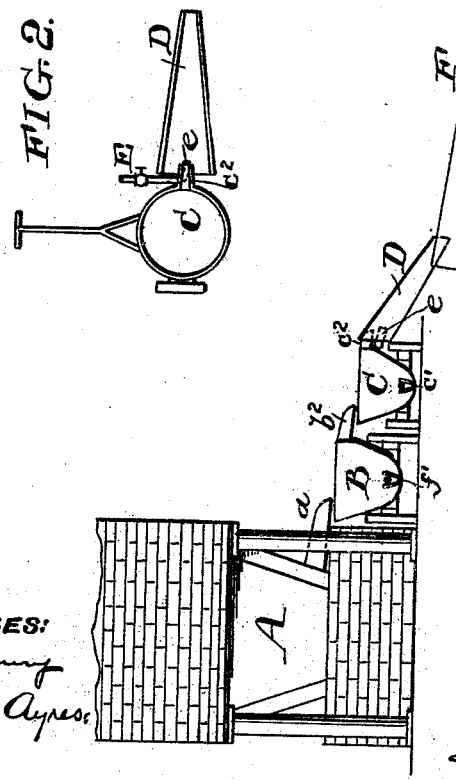
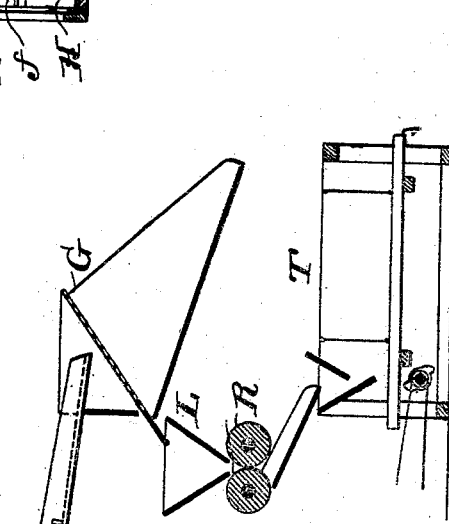
WITNESSES:
INVENTOR:

UNITED STATES PATENT OFFICE.

MALVERN W. ILES, OF DENVER, COLORADO.

METHOD OF TREATING SLAG.

SPECIFICATION forming part of Letters Patent No. 505,551, dated September 26, 1893.

Application filed February 21, 1893. Serial No. 463,209. (No specimens.)

*To all whom it may concern:*

Be it known that I, MALVERN W. ILES, a citizen of the United States, residing at the city of Denver, in the county of Arapahoe, in the State of Colorado, have invented a certain new and useful Improvement in Methods of Treating Slag, of which the following is a true and exact description, reference being had to the accompanying drawings, which form a part of this specification.

The invention relates to the treatment of slag as it comes from the metallurgic furnaces or the method may be used to recover matte from old slag which is remelted.

In many smelting operations and notably in argentiferous lead smelting a considerable quantity of matte rich in precious metals is mixed in a fine state of division in the slag which is run out of the furnace slag tap. Heretofore many more or less successful devices have been employed to save the matte by causing it to settle in fore-hearths or matte pots and drawing off the impoverished slag, but for the most part these devices are known to be but partially efficient and the slag which goes to the dump still contains a quantity of matte. Now I have ascertained that a further and in the aggregate a great saving in matte can be effected by breaking up or granulating the slag, preferably first impoverished by subsidence, which I accomplish by mixing the melted slag with water, preferably running the slag in a thin stream into a rapidly moving jet or current of cold water and then separating the heavier particles by concentration in any of the many well known ways, but while a considerable saving can be thus effected I prefer to further commute the granulated slag by crushing and then to concentrate the granulated and crushed material. I also prefer to effect the transportation of the slag from the point where I granulate it by means of the water used in granulation and to use a conduit in which a portion of the heavier richer particles will be retained while the lighter slag, &c., will be carried on and by preference further broken up and concentrated.

My new process will be best understood as described in connection with the drawings which represent a combination of instrumentalities adapted for use in carrying out my invention and in which—

Figure 1 shows an elevation of an apparatus designed to carry my invention into practice. Fig. 2, is a plan; Fig. 3, a perspective view showing the water inlet pipe, and Fig. 4, a detail.

As shown A represents a metallurgic furnace of the usual type furnished with a slag spout $d$ from which the slag is drawn off into the pot B. This pot B has a lower tap hole $f'$ for tapping off the matte when it accumulates in quantity and an upper spout $b''$ from which the slag runs as shown to a second settling pot C provided also with a matte tap $c'$ and a slag spout $c''$.

Below the spout $c''$ of the pot C, is the nozzle $e$ of a water pipe E. This nozzle is shown somewhat flattened but this is not necessary. From the nozzle $e$ issues a stream of water with considerable force and the nozzle is arranged to project the stream of water into a chute D. The heated slag flows from the mouth $c''$ preferably in a thin stream into the water jet issuing from the nozzle $e$. The heated slag in striking the cold water is broken into small granular pieces often shot like, which are carried down the steep chute D which is made of cast iron, into the trough F. This trough F is made of planks and has a cast iron bottom H.

The inclination of the chute D is rather steep while the inclination of the trough F is much less so, and arranged across the bottom of trough F are a number of riffle bars $f$ which will separate the heavier matte from the lighter slag. The matte and metalliferous particles thus collected can be removed. At the end of the trough the slag is carried on to a screen G through which the water passes and the solid particles are conducted by chutes L to a set of rolls R where the larger pieces of slag are ground up and the whole mass acquires a uniform size. From the rolls the crushed mass of matte and slag is led to the hopper of a concentrator, T where the matte and metalliferous particles are effectually separated.

Where old slag is remelted it may be advisable to dispense with one or possibly both of the settling pots B, C. Obviously the mixed slag and water can be passed directly to the rolls R without separating the slag from the water by a screen G or otherwise. As to the necessary head of water it may be obtained by a pump or by a natural or artificial head.

I have found in practice that the cooling water should issue from the nozzle e with such a velocity as would be due to a head of thirty feet and that the chute D should be set at an angle of about thirty degrees to give the best results.

Having now described my invention, what I claim as new, and desire to secure by Letters Patent, is—

1. The method of separating matte and metalliferous particles from slag which consists in granulating the slag by mixing it while hot with water crushing the granulated slag and concentrating the crushed material to separate the heavier metalliferous particles.

2. The method of treating slag to separate matte and other metalliferous particles which consists in conducting the heated slag and matte through several settling pots to effect a separation of matte by subsidence granulating the impoverished slag by mixing it while hot with cold water and concentrating the comminuted particles to separate the metalliferous particles from the slag.

3. The method of separating matte and metalliferous particles from slag which consists in granulating the slag by running it in a melted condition into a rapidly moving stream of water, carrying away the granulated slag by means of said stream of water, separating the slag from the water, crushing the slag and finally concentrating the comminuted material to separate the matte and metalliferous particles.

4. The method of separating matte and metalliferous particles from slag which consists in granulating the slag by running it in a melted condition into a rapidly moving stream of water carrying away the granulated slag by means of said stream of water, separating the heavier matte containing granules in the conduit then crushing the slag and finally concentrating the comminuted material to separate the matte and metalliferous particles from the slag.

MALVERN W. ILES.

Witnesses:
JOHN S. WILLIAMS,
JOHN M. WALKER.